(12) United States Patent
Putzig et al.

(10) Patent No.: US 6,255,441 B1
(45) Date of Patent: Jul. 3, 2001

(54) TITANIUM-CONTAINING CATALYST COMPOSITION AND PROCESSES THEREFOR AND THEREWITH

(75) Inventors: Donald Edward Putzig, Newark; Edward Francis McBride, Wilmington; Hiep Quang Do, Newark, all of DE (US); James Arthur Trainham, Wilmington, NC (US); Hermann Ludwig Jaeger, Hamm; Heiner Schulte, Munster, both of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/291,958

(22) Filed: Apr. 15, 1999

Related U.S. Application Data

(63) Continuation-in-part of application No. 09/062,348, filed on Apr. 17, 1998, now abandoned.

(51) Int. Cl.$^7$ .................................................. C08G 63/00
(52) U.S. Cl. ........................... 528/271; 528/176; 528/272
(58) Field of Search ................... 528/176, 271, 528/272

(56) References Cited

U.S. PATENT DOCUMENTS

| | | | |
|---|---|---|---|
| 3,056,818 | 10/1962 | Werber | 260/410.6 |
| 3,326,865 | * 6/1967 | Schultheis | 528/176 |
| 3,338,935 | 8/1967 | Kerschner et al. | 260/429.5 |
| 3,441,540 | 4/1969 | Müller et al. | 260/75 |
| 4,010,145 | 3/1977 | Russin et al. | 260/75 R |
| 4,277,415 | 7/1981 | Sugerman et al. | 260/429.5 |
| 4,361,694 | 11/1982 | Weinberg et al. | 528/279 |
| 4,424,140 | 1/1984 | Weinberg et al. | 502/155 |
| 4,482,700 | 11/1984 | Kühnrich et al. | 528/279 |
| 4,512,928 | 4/1985 | Sugerman et al. | 260/410.9 R |
| 5,015,759 | 5/1991 | Lowe | 560/91 |
| 5,120,822 | 6/1992 | Hoeschele et al. | 528/272 |
| 5,453,479 | 9/1995 | Borman et al. | 528/279 |
| 5,922,828 | 7/1999 | Schiraldi | 528/279 |

FOREIGN PATENT DOCUMENTS

| | | |
|---|---|---|
| 0 634 435 A1 | 1/1995 | (EP) . |
| 0 812 818 A1 | 12/1997 | (EP) . |
| 46-27552 | 8/1971 | (JP) . |
| 47-26437 | 7/1972 | (JP) . |
| 61-11248 | 4/1986 | (JP) . |
| 61-25738 | 6/1986 | (JP) . |
| 63-15937 | 4/1988 | (JP) . |
| 7-39481 | 5/1995 | (JP) . |
| WO 97/47675 | 12/1997 | (WO) . |
| WO 99/28033 | 6/1999 | (WO) . |

* cited by examiner

Primary Examiner—Terressa M. Boykin

(57) ABSTRACT

A catalyst composition is disclosed. The composition comprises a titanium compound, a solubility promoter, a phosphorus source, a solvent, and optionally a sulfonic acid, a cocatalyst, or both. The cocatalyst can be a cobalt/aluminum catalyst, an antimony compound, or combinations thereof. Also disclosed is a process for producing the composition. The process comprises combining a titanium compound, a solubility promoter, a phosphorus source, a solvent, and optionally a sulfonic acid, a cocatalyst, or both. Further disclosed is a process for using the composition which comprises contacting a carbonyl compound, in the presence of the composition, with an alcohol under a condition suitable for esterification, transesterification, polymerization, or combinations thereof.

52 Claims, No Drawings

TITANIUM-CONTAINING CATALYST COMPOSITION AND PROCESSES THEREFOR AND THEREWITH

This is a continuation-in-part of application Ser. No. 09/062,348 filed Apr. 17, 1998, now abandoned.

FIELD OF INVENTION

This invention relates to a catalyst composition comprising a titanium compound, to a process for producing the composition, and to a process for using the composition in, for example, esterification, transesterification, or polymerization of a carbonyl compound.

BACKGROUND OF THE INVENTION

Polyesters such as, for example, polyethylene terephthalate (PET) and polybutylene terephthalate (PBT), generally referred to as "polyalkylene terephthalates", are a class of important industrial polymers. They are widely used in thermoplastic fibers, films, and molding applications.

Polyalkylene terephthalates can be produced by transesterification of a dialkyl terephthalate ester with a glycol or by direct esterification of terephthalic acid with the selected glycol followed by polycondensation. A catalyst is used to catalyze the esterification, transesterification or polycondensation.

Many commercial processes use manganese or zinc salts as the catalyst for the transesterification step. Antimony, in the form of a glycol solution of antimony oxide, typically is used as the polycondensation catalyst in either the transesterification or direct esterification process outlined above. However, antimony forms insoluble antimony complexes that plugs fiber spinnerets. Furthermore, the use of antimony catalysts is generally regarded as less environmentally friendly, heavy metal related issues may come up in food contact applications.

Organic titanates, such as tetraisopropyl and tetra n-butyl titanates, are known to be effective polycondensation catalysts for preparing polyalkylene terephthalates in general, and frequently are the catalyst of choice. However, organic titanates are not generally used in producing PET because residual titanate tends to react with trace impurities, such as aldehydes, formed during the polycondensation and processing of PET thereby generating undesirable yellow discoloration. Additionally, many organic titanate catalysts are also substantially insoluble in a polymerization mixture thereby creating a non-uniform distribution of catalyst in the mixture.

Therefore, there is an increasing need for the development of a new catalyst that is substantially soluble, efficient, and produces a polymer with reduced color.

An advantage of the present invention catalyst composition is that, when used in producing a particular polyalkylene terephthalate, it has a high reactivity and the polymer produced therefrom has improved optical properties (e.g., less undesirable color) compared to polymer produced using previously known organic titanate catalysts. Other advantages will become more apparent as the invention is more fully disclosed hereinbelow.

SUMMARY OF THE INVENTION

According to a first embodiment of the present invention, a catalyst composition, which can be used as an esterification or transesterification catalyst, or as a polycondensation catalyst to produce polyalkylene terephthalates, is provided. The composition comprises an organic titanium compound, a solubility promoter, and a phosphorus source. The composition can further comprise a sulfonic acid, and optionally a cocatalyst in which the solubility promoter is selected from the group consisting of ortho silicates, ortho zirconates, and combinations thereof.

According to a second embodiment of the present invention a process for the production of a catalyst composition is provided. The process comprises combining a solvent, an organic titanium compound, a phosphorus source, a solubility promoter, and optionally a sulfonic acid, a cocatalyst, or combinations thereof in which the solubility promoter is selected from the group consisting of ortho silicates, ortho zirconates, and combinations thereof.

According to a third embodiment of the present invention, a process which can be used in, for example, the production of an ester or polyester is provided. The process comprises contacting, in the presence of a catalyst composition, a carbonyl compound with an alcohol. The catalyst composition is the same as that disclosed above.

DETAILED DESCRIPTION OF THE INVENTION

According to the first embodiment of the present invention, a catalyst composition is provided. The composition can comprise an organic titanium compound, a solubility promoter, a phosphorus source, and optionally a sulfonic acid, a cocatalyst, or combinations thereof. The composition can also consist essentially or consist of an organic titanium compound, a solubility promoter, a phosphorus source, and a sulfonic acid. The solubility promoter can be selected from the group consisting of ortho silicates, ortho zirconates, and combinations thereof and the cocatalyst can be selected from the group consisting of a cobalt/aluminum catalyst as described in U.S. Pat. No. 5,674,801, an antimony compound, and combinations thereof.

The catalyst composition of this invention is substantially soluble in a solvent. The term "substantially" means more than trivial. It is preferred that the composition be completely soluble in the solvent. However, a substantial portion of the composition can also be suspended or dispersed in the solvent. According to the present invention, the presently preferred titanium compounds are organic titanium compounds. Titanium tetrahydrocarbyloxides are presently most preferred organic titanium compounds because they are readily available and effective. Examples of suitable titanium tetrahydrocarbyloxide compounds include those expressed by the general formula $Ti(OR)_4$ where each R is independently selected from the group consisting of an alkyl radical, a cycloalkyl radical, an aralkyl hydrocarbon radical, and combinations of two or more thereof. Each radical can contain from 1 to about 30, preferably 2 to about 18, and most preferably 2 to 12 carbon atoms per radical and each R can be the same or different. Titanium tetrahydrocarbyloxides in which the hydrocarbyl group contains from 2 to about 12 carbon atoms per radical and which is a linear or branched alkyl radical are most preferred because they are relatively inexpensive, more readily available, and effective in forming the solution. Suitable titanium tetrahydrocarbyloxides include, but are not limited to, titanium tetraethoxide, titanium propoxide, titanium isopropoxide, titanium tetra-n-butoxide, titanium tetrahexoxide, titanium tetra 2-ethylhexoxide, titanium tetraoctoxide, and combinations of any two or more thereof.

The presence of a halide, or of other active substituent, in the R group generally is avoided since such substituents can interfere with catalytic reactions or form undesired by-products, which can contaminate the polymer when the titanium compound is used for producing a polymer. Presently it is also preferred that the each R group is identical to facilitate synthesis of the organic titanate. In some cases two or more R groups can be from a common compound chemically bonded together other than at the titanium atom (i.e., multidentate ligands such as triethanolamine, citric acid, lactic acid, malic acid, tartaric acid, hydroxyglycine, a salt of the acid, and combinations of two or more thereof).

The titanium tetrahydrocarbyloxides suitable for use in the present invention can also be produced by, for example, mixing titanium tetrachloride and an alcohol in the presence of a base, such as ammonia, to form the tetraalkyl titanate. The alcohol typically is ethanol, n-propanol, isopropanol, n-butanol, or isobutanol. Methanol generally is not employed because the resulting tetramethyl titanate is insoluble in the reaction mixture, complicating its isolation. Tetraalkyl titanates thus produced can be recovered by first removing by-product ammonium chloride by any means known to one skilled in the art such as filtration followed by distilling the tetraalkyl titanate from the reaction mixture. This process can be carried out at a temperature in the range of from about 0 to about 150° C. Titanates having longer alkyl groups can also be produced by transesterification of those having R groups up to $C_4$ with alcohols having more than 4 carbon atoms per molecule.

Examples of commercially available organic titanium compounds include, but are not limited to, TYZOR® TPT and TYZOR® TBT (tetra isopropyl titanate and tetra n-butyl titanate, respectively) available from E. I. du Pont de Nemours and Company, Wilmington, Del., U.S.A.

It is presently preferred that the phosphorus source be selected from a phosphonic acid, a phosphinic acid, a phosphine, or combinations thereof. Wishing not to be bound by theory, it appears that the phosphorus compounds bind to an organic titanium compound during preparation of the catalyst composition thereby improving the solubility of the titanium compound and aiding in control of the optical properties on the polyester produced using these compounds.

The phosphonic acid, phosphinic acid, or phosphine can have an alkyl, alkenyl, alkaryl, aryalkyl, or aryl group directly bonded to the phosphorus atom. Typically each group can contain 1 to about 25, preferably 1 to about 20, and most preferably 1 to 15 carbon atoms per group. For example, methyl group, ethyl group, a phenyl group, or naphthyl group can be present. These groups can further be substituted with substituent groups that do not unduly interfere with the preparation of the catalyst composition or subsequent reactions employing the catalyst. Furthermore, the hydroxy group of the acid can also be substituted. For example, one or two OH groups bonded to the phosphorus atom of a phosphonic acid can be esterified.

The organic phosphonic acids tend to be stronger chelating agents than the phosphinic acids, and can be used for applications where a strong bond is desired between the phosphorus compound and the organic titanium compound. Phenyl phosphinic acid, diphenyl phosphinic acid and 3-(hydroxyphenylphosphinyl) propanoic acid have been found to provide an excellent balance between reaction rate and preventing color generation in applications wherein the catalyst system is used as a polycondensation catalyst for the preparation of polyalkylene terephthalates in general, and PET in particular. Examples of suitable phophines include, but are not limited to, 1,2-bis-diphenylphosphinoethane, 1,3-bis-diphenylphosphinopropane, 1,4-bis-diphenylphosphinobutane, bis-4-tolylphosphine oxide, bis-3,5-xylylphosphine oxide, or combinations of two or more thereof.

Any solvent that can substantially dissolve the catalyst composition disclosed above can be used in the present invention. The presently preferred solvent is an alcohol having the formula of $R^1(OH)_n$, an alkylene glycol of the formula $(HO)_nA(OH)_n$, a polyalkylene glycol or alkoxylated alcohol having the formula of $R^1O[CH_2CH(R^1)O]_nH$, or combinations of two or more thereof in which each $R^1$ can be the same or different and is a hydrocarbyl radical having 1 to about 10, preferably 1 to about 8, and most preferably 1 to 5 carbon atoms per radical. The presently preferred $R^1$ is an alkyl radical, either branched or straight chain. A can have 2 to about 10, preferably 2 to about 7, and most preferably 2 to 4 carbon atoms per molecule. Each n can be the same or different and is independently a number in the range of from 1 about to about 10, preferably 1 to about 7, and most preferably 1 to 5. Examples of suitable solvents include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof. The presently preferred solvent is ethylene glycol for the polyester produced therefrom has a wide range of industrial applications.

The presently preferred solubility promoter can be an organic silicate, organic zirconate, or combinations thereof Presently, it is most preferred that a solubility promoter can facilitate the dissolution of essentially all of the titanium present in the catalyst composition in a solvent used to prepare the composition, at room temperature (about 25° C.), at catalyst composition concentrations that are desired for the particular application. Typically the components are selected to form a catalyst composition that is dissolved in concentrations of at least 3 grams, preferably at least 5 grams, of catalyst per 100 grams of solvent, to minimize the amount of solvent introduced to a process employing the catalyst. The presently most preferred solubility promoters include, but are not limited to, organic ortho silicates, organic ortho zirconates, or combinations thereof. The organic ortho silicates have the formula of $Si(OR^1)_4$ and the organic ortho zirconates have the formula of $Zr(OR^1)_4$ in which each $R^1$ is the same as that disclosed above. These solubility promoters are generally commercially available or can be produced by, for example, introducing a silicon tetrachloride or zirconium tetrachloride into a solvent disclosed above to replace the chlorides with the $R^1$ groups in the solvent. Examples of suitable solubility promoters include, but are not limited to, tetraethyl ortho silicate, tetra-n-propyl ortho silicate, tetra n-propyl ortho zirconate, tetra n-butyl ortho zirconate, and combinations of two or more thereof Tetraethyl ortho silicate and tetra-n-propyl ortho silicate are commercially available. Tetra n-propyl ortho zirconate and tetra n-butyl ortho zirconate are organic zirconates commercially available from E. I. du Pont de Nemours and Company under the "TYZOR®" trademark. Choice of a particular ortho silicate or zirconate will vary with the particular reaction to be promoted. For example, an ortho silicate is preferred over an ortho zirconate in preparing PET, however, since it has less of an effect on the condensation rate.

A sulfonic acid or salt thereof can optionally be used in the present invention. The presently preferred sulfonic acids can be any aryl or alkyl sulfonic acid that can be substantially soluble in a solvent disclosed above. Examples of suitable sulfonic acids include, but are not limited to, p-toluene sulfonic acid, benzene sulfonic acid, methane sulfonic acid, ethane sulfonic acid, propane sulfonic aicd, butane sulfonic acid, and combinations of two or more thereof. The salt of sulfonic acid can be an alkali metal salt, an alkaline earth metal salt, an ammonium salt, or combinations of two or more thereof.

The catalyst composition can further comprise a cocatalyst. Examples of cocatalysts include, but are not limited to, cobalt/aluminum catalysts, antimony compounds, and combinations thereof. The cobalt/aluminum catalyst comprises a cobalt salt and an aluminum compound in which the mole ratio of aluminum to cobalt is in the range of from 0.25:1 to 16:1. The cobalt/aluminum catalyst is disclosed in the U.S. Pat. No. 5,674,801, disclosure of which is incorporated herein by reference.

The presently preferred antimony compound can be any antimony compounds that are substantially soluble in a solvent disclosed above. Examples of suitable antimony compounds include, but are not limited, antimony oxides, antimony hydroxides, antimony halides, antimony sulfides, antimony carboxylates, antimony ethers, antimony glycolates, antimony alcoholates, antimony nitrates, antimony sulfates, antimony phosphates, and combinations of two or more thereof.

According to the first embodiment of the present invention, the molar ratio of phosphorus source to titanium compound, measured as P:Ti, can be in the range of from about 0.1:1 to about 10:1, preferably about 0.5:1 to about 7:1, and most preferably 1:1 to about 4:1. The molar ratio of solubility promoter to titanium compound (Si:Ti or Zr:Ti) can be in the range of from about 0.1:1 to about 10:1, preferably about 0.5:1 to about 7:1, and most preferably 1:1 to 4:1. The molar ratio of sulfonic acid to titanium compound ($SO_3$:Ti) is generally preferred to be less than or equal to 2:1. However, the ratio can also be in the range of from about 0.1:1 to about 4:1, preferably about 0.5:1 to about 3:1, and most preferably about 1:1 to about 2:1. The molar ratio of cocatalyst to titanium compound such as Sb:Ti or Co:Ti can be in the range of from about 0.01:1 to about 10:1. The molar ratio of phosphorus source to the solubility promoter (Si:P or Zr:P) generally is greater or equal to about 0.5:1 if the catalyst composition is used in the production of a polyalkylene terephthalate because lower ratios can cause discoloration in the polyalkylene terephthalate. Alternatively, the titanium compound can be present in the catalyst composition in the range of from about 0.01 to about 15, preferably about 0.1 to about 10, and most preferably 0.5 to 5 percent (%), based on total weight of the composition as 100%.

According to the present invention, the catalyst composition, especially the one that comprises a sulfonic acid, can further comprise water. The water-containing composition possesses a high degree of activity and aids in controlling the optical properties of the polyester produced using the composition. The molar ratio of water, when present, to titanium compound can be in the range of about 0.01:1 to about 6:1, preferably about 0.1:1 to about 4:1, and most preferably about 1:1 to about 2:1.

While the catalyst composition has been described in detail for its preferred application, as a polycondensation catalyst for the manufacture of polyalkylene terephthalates, the composition also has general utility as an esterification or transesterification catalyst in conventional processes requiring a highly active catalyst. For example, the catalyst composition may be employed in the reaction of phthalic anhydride and octyl alcohol to from dioctyl phthalate, a plasticizer for polyvinyl chloride, having low haze. The relative ratios of the catalyst components can be adjusted to meet the requirements of a particular application.

The catalyst composition can be produced by any means known to one skilled in the art. However, it is preferred it be produced by the process disclosed in the second embodiment of the present invention.

The catalyst composition can be produced in a solvent that is compatible with or does not interfere with an esterification or transesterification or polycondensation reaction. For example, if the catalyst composition is used as a polycondensation catalyst for producing PET, the composition is preferably produced in ethylene glycol; if the catalyst composition is used for producing PBT, the composition is preferably produced in 1,4-butanediol; and if the catalyst composition is used for producing polypropylene terephthalate (PPT), the composition is preferably produced in 1,3-propylene glycol. For the production of dioctylphthalate, 2-ethylhexyl alcohol is the preferred alcohol.

While the individual components can be combined in any order, it is preferred to first combine a solubility promoter and a solvent to produce a first mixture. The first mixture is then combined with a phosphorus source to produce a second mixture because the solubility promoter aids the phosphorus source to dissolve. Generally the combination for producing the first or second mixture can be stirred and can be carried out at a temperature in the range of from about 0° C. to about 100° C., preferably about 30° C. to about 50° C. Generally any amount of solvent can be used as long as the amount can substantially dissolve the composition and can be in the range of from about 5 to about 50, preferably about 10 to about 30, and most preferably 10 to 20 moles per mole of the titanium compound used in the composition.

The titanium compound can then be combined with the second mixture to produce the catalyst composition of the present invention. This step is preferably carried out under an inert atmosphere, such as nitrogen, carbon dioxide, helium, or combinations of two or more thereof to avoid liberating a flammable alcohol because this step is exothermic causing the temperature to rise 10 to 30° C. This step can be carried out by stirring for a period of time sufficient to substantially dissolve the titanium compound, generally about 5 minutes to about 20 hours or more followed by cooling to ambient temperature.

The catalyst composition can then be combined with a sulfonic acid, a cocatalyst, or both to produce an optional catalyst composition. The sulfonic acid, can also be contemporaneously combined with the phosphorus source and the first mixture to produce the second mixture.

Alternatively, the phosphorus source can be combined with a solvent and a titanium compound to form a complex. The complex can be isolated from the solvent by any conventional means such as filtration to produce an isolated complex. The isolated complex can then be combined with a mixture which comprises a solvent, solubility promoter, sulfonic acid, or cocatalyst, or combinations of two or more thereof to produce the catalyst composition of the present invention.

The quantities of individual components can vary with the selected compounds and generally can be such that the molar ratio of each component to titanium in the catalyst compound produced is within the range disclosed above.

The structure of the catalyst system has not been established. Based on the observed exotherm, however, it is believed that the components have reacted or complexed in some manner to form binary or tertiary composition(s), at least to some extent, that render the catalyst composition especially useful as a polycondensation catalyst in the manufacture of polyalkylene terephthalates in general, and polyethylene terephthalate (PET) in particular.

According to the third embodiment of the present invention, a process which can be used in, for example, the production of an ester or polyester is provided. The process comprises contacting, in the presence of a catalyst composition, a carbonyl compound with an alcohol. The composition is the same as that disclosed above in the first embodiment of the present invention.

According to the third embodiment of the invention, any carbonyl compound which can react with an alcohol to produce an ester can be used. Generally, such carbonyl compounds include, but are not limited to, acids, esters, amides, acid anhydrides, acid halides, oligomers or polymers having repeat units derived from an acid, or combinations of two or more thereof The presently preferred acid is an organic acid. The presently preferred processes are (1) the production of an ester such as, for example, bis(2-ethylhexyl)phthalate from phthalic anhydride and 2-ethylhexanol and (2) the polymerization of an acid or an ester and an alcohol for the production of a polyester.

A preferred process for producing an ester or polyester comprises, consists essentially of, or consists of contacting a reaction medium with a composition disclosed above in the first embodiment of the invention. The reaction medium can comprise, consist essentially of, or consist of (1) either an organic acid or an ester thereof and an alcohol, or (2) an alcohol and an oligomer having repeat units derived from an organic acid or ester.

The carbonyl compound, organic acid or ester thereof, can have the formula of $(HO)_m R^2 (COOR')_p$ in which m is a number from 0 to about 10, preferably 0 to about 5, and most preferably 0 to 3; each $R^2$ and R' can be independently (1) hydrogen, (2)hydrocarbyl radical having a carboxylic acid group at the terminus, (3) hydrocarbyl radical, or (4) combinations of two or more thereof in which each radical can be substituted or unsubstituted; each radical has 1 to about 30, preferably about 3 to about 15 carbon atoms per radical which can be alkyl, alkenyl, aryl, alkaryl, aralkyl radical, or combinations of two or more thereof; and p can be an integer from 1 to a number equaling to the number of carbon atoms of $R^2$. Any anhydrides of the organic acids can also be used. The presently preferred organic acid is an organic acid having the formula of $HO_2CA^1CO_2H$ in which $A^1$ is an alkylene group, an arylene group, alkenylene group, or combinations of two or more thereof. Each $A^1$ has about 2 to about 30, preferably about 3 to about 25, more preferably about 4 to about 20, and most preferably 4 to 15 carbon atoms per group. Examples of suitable organic acids include, but are not limited to, terephthalic acid, isophthalic acid, napthalic acid, succinic acid, adipic acid, phthalic acid, glutaric acid, acrylic acid, oxalic acid, benzoic acid, maleic acid, propenoic acid, 4-hydroxybenzoic acid, 12-hydroxydecanoic acid, 6-hydroxyhexanoic acid, 4-hydroxycinnamic acid, 4-hydroxymethylbenzoic acid, 4-hydroxyphenylacetic acid, azelaic acid, salicylic acid, caproic acid, stearic acid, palmitic acid, fumaric acid, naphthlane dicarboxylic acid, citric acid, trimesic acid, pamoic acid, sebacic acid, any anhydride of these acids, and combinations of two or more thereof The presently preferred organic diacid is terephthalic acid because the polyesters produced therefrom have a wide range of industrial applications. Examples of suitable esters include, but are not limited to, dimethyl adipate, dimethyl phthalate, dimethyl terephthalate, methyl benzoate, dimethyl glutarate, and combinations of two or more thereof.

Any alcohol that can esterify an acid to produce an ester or polyester can be used in the present invention. The presently preferred alcohol has the formula of $R^3(OH)_n$, an alkylene glycol of the formula $(HO)_nA(OH)_n$, or combinations thereof in which each $R^3$ can be the same or different and is a hydrocarbyl radical having 1 to about 10, preferably 1 to about 8, and most preferably 1 to 5 carbon atoms per radical. The presently preferred $R^3$ is an alkyl radical, either branched or straight chain. A can have 2 to about 10, preferably 2 to about 7, and most preferably 2 to 4 carbon atoms per molecule. Each n can be the same or different and is independently a number in the range of from 1 about to about 10, preferably 1 to about 7, and most preferably 1 to 5. Examples of suitable alcohols include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, stearyl alcohol, butylene glycol, 1,6-hexanediol, glycerol, pentaerythritol, and combinations of two or more thereof. The presently most preferred alcohol is an alkylene glycol such as ethylene glycol for the polyester produced therefrom has a wide range of industrial applications.

The contacting of reaction medium with the catalyst can be carried out by any suitable means. For example, the individual compositions of the reaction medium can be combined before being contacted with the catalyst. However, it is presently preferred that the catalyst be first dissolved or dispersed in an alcohol by any suitable means such as mechanical mixing or stirring to produce a solution or dispersion followed by combining the solution or dispersion with (1) an organic acid, an ester, an oligomer of an organic acid, or combinations of two or more thereof and (2) an alcohol under a condition sufficient to effect the production of an ester or polyester.

According to the present invention, the reaction medium, if a sulfonic acid is present in the catalyst composition, can also comprises water. The quantity of water, if present, is the same as that disclosed above.

The oligomer of the diacid and alkylene glycol generally has a total of about 1 to about 100, preferably from about 2 to about 10 repeat units derived from the diacid and alkylene oxide.

A suitable condition to effect the production of a polyester can include a temperature in the range of from about 150° C. to about 350° C., preferably about 200° C. to about 300° C., and most preferably 250° C. to 300° C. under a pressure in the range of from about 0.001 to about 10 atmospheres for a time period of from about 1 to about 20, preferably about 1 to about 15, and most preferably 1 to 10 hours.

The molar ratio of the alcohol (or alkylene glycol) to carbonyl compound (or organic acid or ester ) can be any ratio so long as the ratio can effect the production of a polyester. Generally the ratio can be in the range of from about 0.1:1 to about 10:1, preferably about 0.5:1 to about 5:1, and most preferably about 1:1 to about 3:1. The molar ratio of the alcohol (or alkylene glycol) to carbonyl compound (or organic acid or ester) for the oligomer having repeat units derived from the carbonyl compound (or organic acid or ester) to alcohol (or alkylene glycol) can have the same ratio of q:(q−1) in which q can be in the range of from about 2 to about 20, preferably about 2 to 10, and most preferably 2 to 5.

The catalyst can be present in the range of about 0.0001 to about 30,000 parts per million by weight (ppmw) of the polymerization medium, preferably about 0.001 to about 1,000 ppmw, and most preferably 0.1 to 100 ppmw. Other ingredients also can be present to enhance catalyst stability or performance. While the advantages of the catalyst can be obtained with polyalkylene terephthalates in general, the advantages are particularly evident as a substitute for most of antimony in the manufacture of PET since color purity is an important criteria for commercial articles typically made from PET.

The catalyst composition can be used in producing esters or polyesters by using any of the conventional melt or solid state techniques. The catalyst compositions are compatible with conventional esterification and transesterification catalysts (e.g., manganese, cobalt, and/or zinc salts) and may be introduced to the production process concurrent with, or following, introduction of the esterification catalyst. The catalyst compositions also have been found to be effective in promoting the esterification reaction, and may be used as a substitute for some or all of the esterification catalyst as well as the polycondensation catalyst.

The following Examples are provided to further illustrate the present invention and are not to be construed as to unduly limit the scope of the invention.

EXAMPLES

Dimethyl terephthalate was transesterified with ethylene glycol, using a zinc acetate catalyst, in accordance with Example 1A to form DMT oligomer. Novel catalysts of this invention synthesized in accordance with Examples 2 through 15 were employed as polycondensation catalysts for the DMT of Example 1A following the procedure of Example 1B. The results are recorded in Table 1, along with four (4) control runs.

Color of the resulting polymer was measured in terms of the L-value and b-value, using an instrument such as the SP-78 Spectrophotometer. The L-value shows brightness, with the greater the numerical value showing higher (desirable) brightness. Preferably, the L-value will be equal to or higher than that of the polymer made using antimony catalyst. The b-value shows the degree of yellowness, with a higher numerical value showing a higher (undesirable) degree of yellowness. Preferably, the b-value will be equal to or lower than that of the polymer made using antimony catalyst. Because the color measurement is well known to one skilled in the art, the description of which is omitted herein for the interest of brevity.

Example 1A

Preparation of Antimony-free DMT Oligomer

The oligomers used in these examples contained dimethyl terephthalate, ethylene glycol, with no added antimony. It was prepared as follows:

An autoclave was charged with 100 lbs. (45.4 Kg) of dimethyl terephthalate, 67 lbs. (30.4 Kg) of ethylene glycol and 4.4 g of zinc acetate dihydrate. The batch was heated to 240° C. at an agitation speed of 15 rpm, and 33 lbs. (15.0 Kg) of methanol and 14.3 lbs. (6.5 Kg) of ethylene glycol removed. The charge was then heated to 275° C. over the course of 90 minutes, and the remaining ethylene glycol removed at 285° C. and below 2 mm Hg vacuum. Once the condensation mass was judged to be complete, the molten mass was extruded into an aqueous bath to solidify the product. The resultant polymer was dried to remove residual moisture before use.

Example 1B

Testing of Catalyst in Oligomer

A 1-liter resin kettle was provided with an Jiffy Mixer agitator rotating at 40 rpm, a thermocouple, condenser and nitrogen sweep. To this kettle was added the catalyst to be tested, 115 ml of ethylene glycol, and 400 gm of DMT oligomer prepared as in Example 1A. The agitator was turned on and the temperature was increased to 275° C. over a period of about 2.5 hours. The contents were polymerized by holding under agitation at 275° C. and a pressure of 120 torr for 20 minutes, and at 280° C. and a pressure of 30 torr for an additional 20 minutes. The contents were then held under agitation at 285° C. at 1 to 2 mm Hg pressure for a time sufficient to reach 15 oz-in (ounce-inches) torque as measured by an Electro-Craft Motomatic torque controller. The time for this step was recorded as the Finish Time, and varied with the catalyst used. The polymer melt was then poured into a water bath to solidify the melt, and the resultant solid annealed at 150° C. for 12 hours and ground to pass through a 2 mm filter for color measurements using the previously described spectrophotometer. Results comparing the Finish Time in minutes and the Color as measured spectrophotometrically are given in Table 1 below.

The following examples describe the preparation of the various catalyst compositions tested:

Example 2

A 500 ml flask, equipped with an agitator, condenser, dropping funnel and $N_2$ purge was charged with 240 g (3.87 moles) of ethylene glycol. Agitation was started and 25 g (0.176 moles) of phenylphosphinic acid was added. The slurry was heated to 35–45° C. until the solid dissolved, then 50 g (0.176 moles) of tetraisopropyl titanate (TYZOR® TPT, available from E. I. du Pont de Nemours and Co.) was added dropwise over 1 hour at 35° C. When addition was complete the reaction mass was stirred for 30 minutes, and then 36.6 g (0.176 moles) of tetraethyl orthosilicate (TEOS) was added over 30 minutes. A clear solution containing 2.4% titanium was obtained.

Example 3

Example 2 was repeated, except 73.2 g of TEOS was added. A clear solution containing 2.17% titanium was obtained.

Example 4

A 1 liter flask equipped as in Example 2 was charged with 240.2 g (3.87 moles) of ethylene glycol. Agitation was started and 50 g (0.352 moles) of phenylphosphinic acid was charged. The slurry was heated to 30° C. to 35° C. to dissolve the solid and then 50 g (0.176 moles) of TYZOR® TPT was added dropwise over 1 hour at 45° C. The clear solution contained 2.48% titanium.

Example 5

A 500 ml flask, equipped as in Example 2. was charged with 240 g (3.87 moles) of ethylene glycol. Agitation was started and 50 g (0.352 moles) of phenylphosphinic acid was added. The slurry was heated to 35° C. to 45° C. until the solid dissolved. Then 50 g (0.176 moles) of TYZOR® TPT was added dropwise over 1 hour with cooling at 40° C. or less. When the addition was complete, the reaction mass was stirred for 1 hour.

To 50 g of the above reaction mass was added 5.4 g of tetraethyl orthosilicate at room temperature. After mixing, a clear solution containing 2.24% titanium was obtained with a molar ratio of Ti:P:Si of 1:2:1.

Example 6

A 100 ml flask, equipped as in example 2, was charged with 35.3 g (0.569 moles) of ethylene glycol. Agitation was started and 7.3 g (0.052 moles) of phenylphosphinic acid was added. The reaction mass was heated to 35° C. to dissolve the solid and then 7.4 g (0.026 moles) of TYZOR® TPT was added dropwise at 45° C. over 15 minutes. When addition was complete, 10.77 g (0.052 moles) of TEOS was added. The resultant clear solution contained 2.04% titanium.

Example 7

A 100 ml flask, equipped as in example-2, was charged with 35.3 g (0.569 moles) of ethylene glycol. Agitation was started and 7.3 g (0.052 moles) of phenylphosphinic acid was added. The reaction mass was heated to 45° C. to dissolve the solid and then 7.4 g (0.026 moles) of TYZOR® TPT was added dropwise over 15 minutes. Then 16.2 g (0.078 moles) of TEOS was added. The resultant clear solution contained 1.87% titanium.

Example 8

A 500 ml flask, equipped as in Example 2, was charged with 240.2 g (3.869 moles) of ethylene glycol. Agitation was started and 75 g (0.528 moles) of phenylphosphinic acid was added. The reaction mass was heated to 45° C. until the solid dissolved and then 50 g (0.176 moles) of TYZOR® TPT was added dropwise over 1 hour at 45° C. Then 36.6 g (0.176 moles) of TEOS was added to give a clear solution containing 2.1% titanium.

Example 9

Example 8 was repeated except 73.2 g (0.352 moles) of TEOS was used to give a clear solution containing 1.92% titanium.

Example 10

Example 8 was repeated, except 99.8 g (0.528 moles) of TEOS was added to give a clear solution containing 1.77% titanium.

Example 11

A 500 ml flask, equipped as for Example 2, was charged with 240.2 g (0.3869 moles) of ethylene glycol. Agitation was started and 100 g (0.703 moles) of phenylphosphinic acid was added. The reaction mass was heated to 35° C. to dissolve the solids, then 50 g (0.176 moles) of TYZOR® TPT was added dropwise over 1 hour to give a clear solution containing 2.16% titanium.

Example 12

Example 11 was repeated only 36.6 g (0.176 moles) of TEOS was added to the reaction mixture after the TYZOR® TPT to give a clear solution containing 1.97% titanium.

Example 13

Example 11 was repeated, except 53.2 g (0.352 moles) of TEOS was added after the TYZOR® TPT to give a clear solution containing 1.82% titanium.

Example 14

A 500 ml flask, equipped as for Example 2, was charged with 240.2 g (3.869 moles) of ethylene glycol. Agitation was started and 100 g (0.703 moles) of phenylphosphinic acid was added. The reaction mass was heated to 45° C. to dissolve the solids and then 109.9 g (0.528 moles) of TEOS was added. Then 50 g (0.176 moles) of TYZOR® TPT was added dropwise over 1 hour at 38° C. to give a clear solution containing 1.68% titanium.

Example 15

A 100 ml flask, equipped as in Example 2 was charged with 40 g (0.0135 moles) of a solution of titanium tetraphenylphosphinic acid in ethylene glycol/ethanol solution. Agitation was started and 11.27 g (0.0541 moles) of tetraethyl orthosilicate was added dropwise. The resultant solution was stirred at room temperature for 1 hour and bottled out to give 51.3 g of a pale yellow liquid, containing 1.26% titanium.

In the following table, the Ti component was tetraisopropyl titanate, the P component was phenylphosphinic acid and the A component was tetraethyl ortho silicate. The amount of titanium was 25 parts per million (ppm) based on the weight of oligomer. The finish time is the time on hold at the pressure and temperature given until the desired degree of condensation is reached. The pre-condensation composition oligomer was prepared as described in Example 1A. and the catalyst tested as in Example 1B. Except as noted, all catalysts in these runs were glycol-soluble.

TABLE 1

Comparison of Catalysts on Finishing Time and Color
DMT based oligomer, 1 mm Hg, 285 C., 25 ppm Ti

| | Mole Ratio | | | Solubility | Finish Time | Color | | |
|---|---|---|---|---|---|---|---|---|
| Example | Ti | P | Si | in Glycol | (min) | L | b | Notes |
| | Antimony | | | hazy soln | 110 | 71.98 | 7.78 | 1 |
| | 1.0 | 0.0 | 0.0 | insoluble | 75 | 68.80 | 11.57 | 2 |
| | 1.0 | 0.0 | 3.0 | soluble | 90 | 75.32 | 12.00 | 3 |
| — | 1.0 | 1.0 | 0.0 | insoluble | — | | | 4 |
| 2 | 1.0 | 1.0 | 1.0 | soluble | 120 | 73.05 | 13.01 | 5 |
| 3 | 1.0 | 1.0 | 2.0 | soluble | 65 | 73.86 | 11.20 | 5 |
| 4 | 1.0 | 2.0 | 0.0 | soluble | 145 | 73.99 | 12.44 | 5 |
| 5 | 1.0 | 2.0 | 1.0 | soluble | 80 | 76.40 | 10.69 | 5 |
| 6 | 1.0 | 2.0 | 2.0 | soluble | 80 | 77.04 | 9.87 | 5 |
| 7 | 1.0 | 2.0 | 3.0 | soluble | 100 | 76.01 | 11.33 | 6 |
| 8 | 1.0 | 3.0 | 1.0 | soluble | 70 | 74.11 | 10.82 | 5 |
| 9 | 1.0 | 3.0 | 2.0 | soluble | 175 | 70.18 | 8.71 | 5 |
| 10 | 1.0 | 3.0 | 3.0 | soluble | 125 | 70.57 | 11.94 | 6 |
| 11 | 1.0 | 4.0 | 0.0 | soluble | 80 | 74.01 | 11.35 | 6 |
| 12 | 1.0 | 4.0 | 1.0 | soluble | 145 | 75.29 | 10.37 | 5 |
| 13 | 1.0 | 4.0 | 2.0 | soluble | 95 | 76.30 | 9.86 | 5 |
| 14 | 1.0 | 4.0 | 3.0 | soluble | 120 | 79.77 | 7.98 | 5 |
| 15 | 1.0 | 4.0 | 4.0 | soluble | 130 | 74.38 | I0.94 | 6 |

Notes:
1. This is a Control Run using antimony oxide solution in ethylene glycol at 300 ppm antimony.
2. This is a Control Run using tetraisopropyl titanate alone at 25 ppm Ti.
3. This is a Control Run without phenylphosphinic acid and using a mixture of tetraisopropyl titanate and tetraethyl orthosiljcate in a 1:3 molar ratio at 25 ppm Ti.
4. This is a trial in which no silicate was used (no period), resulting in a glycol-insoluble product.
5. In these runs Ti refers to titanium tetraisopropyl titanate (TPT), P refers to phenyl phosphinic acid (PPA) and Si refers to tetraethyl ortho silicate (TEOS). The catalysts were prepared, except where noted, by adding TEOS (when present) to an ethylene glycol solution of a mixture of PPA and TPT. The catalyst was evaluated at 25 ppm Ti.
6. In these runs, the ratio of Si:P was = or >1, which led to lower L color and/or higher b color in the polymer.

The above table shows that when tetraisopropyl titanate (TPT) is used by itself it produces unsatisfactory polymer with a lower L and higher b color than antimony. Addition of tetraethyl orthosilicate (TEOS) to TPT improves L color, however has little effect on b color. When PPA is used in combination with TPT and TEOS, both L and b color are dramatically improved. The higher the ratio of Si/Ti, to a point, the better the L and/or b color. When the ratio of Si/P equals or exceeds 1.0, L and/or b color gets noticeably worse.

Example 16

A. Example 14 catalyst (3.69% Ti) was used to catalyze the esterification of phthalic anhydride and 2-ethyl hexanol. 152.88 g of phthalic anhydride was added to 334.04 g of 2-ethyl hexanol in 1000 mL resin flask, equipped with a $N_2$ gas sparge, Stark receiver, and agitator. The mixture was heated with gentle agitation. The temperature of the reaction climbed steadily until it reached 141° C. At which point, the temperature suddenly dropped to 137° C. The temperature then began to steadily increase again, and distillate began to collect in the receiver. At 143° C., a 3 mL sample was removed from the reaction flask. Fifteen minutes after the first sample was withdrawn, a 2 mL sample was withdrawn followed by the immediate addition of 1.30 g of catalyst at 151° C. 1.30 g of catalyst corresponds to 313.8 ppm of Ti to phthalic anhydride. The final product of this reaction was colorless and had very limited haziness. There did not appear to be any signs of precipitation causing cloudiness.

B. As a control, TYZOR® TBT was used as the catalyst in the esterification of phthalic anhydride and 2-ethyl hexanol. The reaction was run similar to that of the Example 16A esterification as mentioned above. 313.3 ppm of TBT was used. The product of this reaction was colorless, but it had a slight haziness from what appeared to be a suspended precipitate.

Example 17

A 500 ml flask, equipped as in example 2, was charged with 75 g (0.528 moles) of phenylphosphinic acid and 218.6 g of ethylene glycol. Agitation was started and the mixture was heated to 45° C. to dissolve the solids. Once the solids dissolved, 50 g(0.176 moles) of TYZOR® TPT was added dropwise over 30 min., maintaining the temperature at 45+/−2° C. When addition was complete, 110 g (0.534 moles) of tetra-ethylorthosilicate (TEOS) was added dropwise over 30 min., maintaining the temperature at 45° C. +/−2° C. When TEOS addition was complete, 33.5 g(0.176 moles) of p-toluenesulfonic acid was added and agitation continued until the solids dissolved to give a pale yellow solution containing 1.74% Ti.

Example 18

Example 17 was repeated, except 50 g (0.352 moles) of phenylphosphinic acid was used in place of 75 g. The resultant pale yellow solution contained 1.83% Ti.

Example 19

Example 17 was repeated except 50 g(0.352 moles) of phenylphosphinic acid was used in place of 75 g and 67 g(0.352 moles) of p-toluenesulfonic acid in place of 33.5 g. The resultant pale yellow solution contained 1.70% Ti.

Example 20

Example 17 was repeated except 25 g (0.176 moles) of phenylphosphinic acid was used instead of 75 g. The resultant pale yellow solution contained 1.93% Ti.

The results of the above examples are summarized in the following Table 2.

TABLE 2

Comparison of Catalysts on Finishing Time and Color
DMT based oligomer, 1 mm Hg, 285 C., 25 ppm Ti

| | Mole Ratio | | | | Finish Time | Color | | |
|---|---|---|---|---|---|---|---|---|
| Example | Ti | P | SA | Si | (min) | L | b | Notes |
| | Antimony | | | | 95 | 75.52 | 7.07 | 1 |
| 17 | 1.0 | 3.0 | 1.9 | 3.0 | 90 | 73.65 | 7.69 | 2 |
| 18 | 1.0 | 2.0 | 1.0 | 3.0 | 85 | 75.18 | 7.13 | 2 |
| 19 | 1.0 | 2.0 | 2.0 | 3.0 | 75 | 74.94 | 8.21 | 2 |
| 20 | 1.0 | 1.0 | 1.0 | 3.0 | 50 | 74.64 | 8.31 | 2 |

[a]1. Control run using antimony oxide solution on ethylene glycol at 300 antimony.
2. T = tetraisopropyl titanate; P = phenyl phosphinic acid; Si = TEOS; and SA = toluenesulfonic acid.

Table 2 shows an improved rate of polymerization compared to the run using antimony as catalyst.

Examples 21–28

Examples 21 to 28, several combinations shown in Table 1 were retested using 2 mm Hg pressure. The results are shown in Table 3.

TABLE 3

Comparison of Antimony Catalysts for Finishing Time and Color
DMT Based Oligmer 2 mm Hg

| | Mole Ratio | | | | | Finish Time | Color | | |
|---|---|---|---|---|---|---|---|---|---|
| Example | Ti | P | Si | Ti | Sb | (min) | L | b | Notes |
| | Antimony | | | 0 | 375 | 98 | 72.9 | −5.7 | 1 |
| 21 | 1.0 | 4.0 | 3.0 | 20 | 100 | 90 | 62.8 | −5.1 | 2,4 |
| | Antimony | | | 0 | 375 | 92 | 70.5 | −4.0 | 3 |
| 22 | 1.0 | 4.0 | 3.0 | 20 | 100 | 81 | 64.7 | 4.4 | 2,4 |
| 23 | 1.0 | 4.0 | 3.0 | 20 | 50 | 95.5 | 74.2 | 1.2 | 2,4 |
| 24 | 1.0 | 4.0 | 3.0 | 20 | 0 | 93 | 77.5 | 3.2 | 2,4 |
| 25 | 1.0 | 2.0 | 2.0 | 20 | 100 | 81.5 | 72.8 | 0.2 | 2,5 |
| 26 | 1.0 | 2.0 | 2.0 | 15 | 188 | 94.5 | 74.1 | 0.7 | 2,5 |
| 27 | 1.0 | 2.0 | 2.0 | 20 | 375 | 105 | 64.2 | −2.3 | 2,5 |
| 28 | 1.0 | 2.0 | 2.0 | 12.5 | 0 | 101.5 | 77.7 | 1.8 | 2,5 |

[a]1 Control run using antimony oxide.
2. See footnote 2 in Table 2.
3. Second control run.
4. Corresponding to Example 14, Table 1.
5. Corresponding to Example 6, Table 1.

The results in Table 3 show a major reduction in finishing time obtained by using combination(s) of a titanium compound, phosphinic acid, ortho silicate, and antimony.

Example 29

A 500 ml flask, equipped as in example 2, was charged with 50 g( 0.352 moles) of phenylphosphinic acid and 218.6 g of 1,3-propanediol. Agitation was started and the mixture heated to 45° C. to dissolve the solids. When all the solids were dissolved, 110 g (0.528 moles) of tetra-ethylorthosilicate was added dropwise over 30 minutes. Then 50 g(0. 176 moles) of TYZOR® TPT was added dropwise over 30 minutes. Finally 33.5 g of p-toluenesulfonic acid was added and the reaction mass allowed to stir until it all dissolved, The final yellow solution contained 1.8% Ti.

Example 30

A 500 ml flask, equipped as in example 2, was charged with 100 g (0.704 moles) of phenylphosphinic acid and 109.4 g of 1,3 propylene glycol. Agitation was started and the reaction mass heated to 50C and held there until all of the solids dissolved. Then 100 g( 0.528 moles) of tetra-ethylorthosilicate and 50 g (0.176 moles) of TYZOR® TPT was added dropwise in a similar fashion to example 29. The final product was a pale yellow liquid containing 2.3% Ti.

Example 31

A 500 ml flask, equipped as in example 2, was charged with 40 g(0.282 moles) of phenylphosphinic acid and 174.7 g of 1,3-propylene glycol. Then 53.5 g of p-toluenesulfonic (PTSA) was added. The solution was stirred until the PTSA dissolved, and then 40 g(0. 141 moles) of TYZOR® TPT was added dropwise at less than 40° C. The reaction mass was held at 40° C. 1 hr and then cooled to give a pale yellow solution containing 2.2% Ti.

Example 32

In a similar fashion, the ethylene glycol in examples 14 and 18 is replaced with similar amounts of 1,4-butanediol or linear or branched alcohols, such as ethyl alcohol or isopropyl alcohol to give pale yellow solutions, which performed similarly to their ethylene glycol counterparts.

What is claimed is:

1. A composition comprising a titanium compound, a solubility promoter, a phosphorus source, and a solvent wherein said solubility promoter is selected from the group consisting of ortho silicates, ortho zirconates, and combinations thereof and said phosphorus source is selected from the group consisting of a phosphonic acid, a phosphinic acid, a phosphine, and combinations of two or more thereof.

2. A composition according to claim 1 further comprising a sulfonic acid.

3. A composition according to claim 1 further comprising a cocatalyst selected from the group consisting of a cobalt/aluminum catalyst, an antimony compound, and combinations thereof.

4. A composition according to claim 2 further comprising a cocatalyst selected from the group consisting of a cobalt/aluminum catalyst, an antimony compound, and combinations thereof.

5. A composition according to claim 1 wherein said solvent is an alcohol.

6. A composition according to claim 1 wherein said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

7. A composition according to claim 2 wherein said solvent is an alcohol.

8. A composition according to claim 2 wherein said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

9. A composition according to claim 1 wherein said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical.

10. A composition according to claim 1 wherein said titanium compound is selected from the group consisting of tetra isopropyl titanate, tetra n-butyl titanate, and combinations thereof.

11. A composition according to claim 2 wherein said sulfonic acid is selected from the group consisting of p-toluene sulfonic acid, benzene sulfonic acid, methane sulfonic acid, ethane sulfonic acid, propane sulfonic acid, and combinations of two or more thereof.

12. A composition according to claim 1 wherein said composition is produced by combining an organic titanium compound, a phosphorus compound, a solubility promoter, and a solvent wherein said solubility promoter is selected from the group consisting of organic ortho silicates, organic ortho zirconates, and combinations thereof.

13. A composition according to claim 12 wherein said titanium compound has the formula $Ti(OR)_4$ wherein each R is independently selected from the group consisting of all radical, cycloalkyl radical, aralkyl radical, and combinations of two or more thereof and contains from 1 to about 30 carbon atoms per radical.

14. A composition according to claim 12 wherein said phosphorus compound is selected from the group consisting of phosphonic acid, phosphinic acid, a phosphine, and combinations thereof.

15. A composition according to claim 12 wherein said solvent is an alcohol.

16. A composition according to claim 12 wherein said solvent is selected from the group consisting of ethanol, propanol, isopropanol, butanol, ethylene glycol, propylene glycol, isopropylene glycol, butylene glycol, 1-methyl propylene glycol, pentylene glycol, and combinations of two or more thereof.

17. A composition according to claim 12 wherein
said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical;
said phosphorus compound selected from the group consisting of phosphonic acid, phosphinic acid, a phosphine compound and combinations of two or more thereof; and
said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

18. A composition according to claim 17 wherein said titanium compound is selected from the group consisting of tetra isopropyl titanate, tetra n-butyl titanate, and combinations thereof.

19. A composition according to claim 18 further comprising a sulfonic acid.

20. A composition according to claim 17 further comprising a cocatalyst selected from the group consisting of a cobalt/aluminum catalyst, an antimony compound, and combinations thereof.

21. A composition according to claim 19 further comprising a cocatalyst selected from the group consisting of cobalt/aluminum catalyst, antimony compound, and combinations thereof.

22. A composition prepared by combining a titanium compound, a solubility promoter, a phosphorus source, and a solvent wherein said solubility promoter is selected from the group consisting of ortho silicates, ortho zirconates, and combinations thereof and said phosphorus source is selected from the group consisting of a phosphonic acid, a phosphinic acid, a phosphine, and combinations of two or more thereof.

23. A composition according to claim 22 further comprising a sulfonic acid selected from the group consisting of p-toluene sulfonic acid, benzene sulfonic acid, methane sulfonic acid, ethane sulfonic acid, propane sulfonic acid, and combinations of two or more thereof.

24. A composition according to claim 22 further comprising a cocatalyst selected from the group consisting of a cobalt/aluminum catalyst, an antimony compound, and combinations thereof.

25. A composition according to claim 23 further comprising a cocatalyst selected from the group consisting of a cobalt/aluminum catalyst, an antimony compound, and combinations thereof.

26. A composition according to claim 22 wherein said solvent is an alcohol.

27. A composition according to claim 22 wherein said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

28. A composition according to claim 22 wherein said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical.

29. A composition according to claim 22 wherein said titanium compound is selected from the group consisting of tetra isopropyl titanate, tetra n-butyl titanate, and combinations thereof.

30. A process comprising combining a titanium compound, a solubility promoter, a phosphorus source, and a solvent wherein said solubility promoter is selected from the group consisting of ortho silicates, ortho zirconates, and combinations thereof and said phosphorus source is selected from the group consisting of a phosphonic acid, a phosphinic acid, a phosphine, and combinations of two or more thereof.

31. A process according to claim 30 further comprising combining said titanium compound, said solubility promoter, said phosphorus source, and said solvent with a sulfonic acid selected from the group consisting of p-toluene sulfonic acid, benzene sulfonic acid, methane sulfonic acid, ethane sulfonic acid, propane sulfonic acid, and combinations of two or more thereof.

32. A process according to claim 30 wherein said solvent is an alcohol.

33. A process according to claim 30 further comprising combining said titanium compound, said solubility promoter, said phosphorus source, and said solvent with a cocatalyst selected from the group consisting of a cobalt/aluminum catalyst, an antimony compound, and combinations thereof.

34. A process according to claim 30 wherein said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

35. A process according to claim 30 wherein said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical.

36. A process according to claim 30 wherein said titanium compound is selected from the group consisting of tetra isopropyl titanate, tetra n-butyl titanate, and combinations thereof.

37. A process comprising contacting, in the presence of a catalyst, a carbonyl compound and an alcohol wherein said catalyst comprises a titanium compound, a solubility promoter, a phosphorus source, and a solvent wherein said solubility promoter is selected from the group consisting of organic ortho silicates, organic ortho zirconates, and combinations thereof and said phosphorus source is selected from the group consisting of a phosphonic acid, a phosphinic acid, a phosphine, and combinations of two or more thereof.

38. A process according to claim 37 wherein said catalyst further comprises a sulfonic acid selected from the group consisting of p-toluene sulfonic acid, benzene sulfonic acid, methane sulfonic acid, ethane sulfonic acid, propane sulfonic acid, and combinations of two or more thereof.

39. A process according to claim 37 wherein said solvent is an alcohol.

40. A process according to claim 37 wherein said catalyst further comprises a cocatalyst selected from the group consisting of a cobalt/aluminum catalyst, an antimony compound, and combinations thereof.

41. A process according to claim 38 wherein said catalyst further comprises a cocatalyst selected from the group consisting of a cobalt/aluminum catalyst, an antimony compound, and combinations thereof.

42. A process according to claim 37 wherein said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

43. A process according to claim 37 wherein said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical.

44. A process according to claim 42 wherein said titanium compound is selected from the group consisting of tetra isopropyl titanate, tetra n-butyl titanate, and combinations thereof.

45. A process according to claim 37 wherein said carbonyl compound has the formula of RCOOR and said alcohol has the formula of HOAOH wherein each R is independently selected from the group consisting of hydrogen, a hydrocarboxyl radial, a hydrocarbyl radical, and combinations of two or more thereof; each radial has 1 to about 30 carbon atoms and is selected from the group consisting of alkyl radical, aryl radical, alkaryl radical, aralkyl radical, alkenyl radical, and combination of two or more thereof; and A is selected from the group consisting of alkylene goup, arylene group, alkenylene group, and combinations of two or more thereof.

46. A process according to claim 37 wherein said alcohol is selected from the group consisting of ethylene glycol, propylene glycol, isopropylene glycol, butylene glycol, 1-methyl propylene glycol, pentylene glycol, and combinations of two or more thereof.

47. A process according to claim 45 wherein said alcohol is ethylene glycol.

48. A process according to claim 46 wherein said carbonyl compound is selected from the group consisting of terephthalic acid, dimethyl terephthalate, isophthalic acid, napthalic acid, succinic acid, adipic acid, phthalic acid, glutaric acid, acrylic acid, oxalic acid, benzoic acid, maleic acid, propenoic acid, and combination of two or more thereof.

49. A process according to claim 48 wherein said carbonyl compound is terephthalic acid.

50. A process according to claim 49 wherein said alcohol is ethylene glycol.

51. A process according to claim 37 wherein said alcohol is selected from the group consisting of ethylene glycol, propylene glycol, isopropylene glycol, butylene glycol, 1-methyl propylene glycol, pentylene glycol, and combinations of two or more thereof; said carbonyl compound is a terephthalic acid or derivative of terephthalic acid; said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical; and said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

52. A process according to claim 51 wherein said alcohol is ethylene glycol; and said carbonyl compound is selected from the group consisting of terephthalic acid, dimethyl terephthalate, and combinations thereof; said titanium compound is selected from the group consisting of tetra isopropyl titanate, tetra n-butyl titanate, and combinations thereof; and said solvent is ethylene glycol.

\* \* \* \* \*

UNITED STATES PATENT AND TRADEMARK OFFICE
CERTIFICATE OF CORRECTION

PATENT NO. : 6,255,441 B1
DATED : July 3, 2001
INVENTOR(S) : Donald Edward Putzig et al.

It is certified that error appears in the above-identified patent and that said Letters Patent is hereby corrected as shown below:

Column 16,
Line 18, delete "all" and substitute therefor -- alkyl --.

Signed and Sealed this

Fourteenth Day of May, 2002

Attest:

JAMES E. ROGAN
*Attesting Officer*  *Director of the United States Patent and Trademark Office*